(12) United States Patent
Shan et al.

(10) Patent No.: US 12,141,682 B2
(45) Date of Patent: Nov. 12, 2024

(54) ULTRA LOW-POWER NEGATIVE MARGIN TIMING MONITORING METHOD FOR NEURAL NETWORK CIRCUIT

(71) Applicant: SOUTHEAST UNIVERSITY, Jiangsu (CN)

(72) Inventors: Weiwei Shan, Jiangsu (CN); Ziyu Li, Jiangsu (CN); Jun Yang, Jiangsu (CN); Longxing Shi, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 936 days.

(21) Appl. No.: 17/181,595

(22) Filed: Feb. 22, 2021

(65) Prior Publication Data

US 2021/0174184 A1    Jun. 10, 2021

(30) Foreign Application Priority Data

Dec. 18, 2020   (CN) .......................... 202011502323.2

(51) Int. Cl.
  *G06N 3/063*   (2023.01)
  *G06N 3/04*    (2023.01)
  *G06F 119/12*  (2020.01)

(52) U.S. Cl.
  CPC ............... *G06N 3/063* (2013.01); *G06N 3/04* (2013.01); *G06F 2119/12* (2020.01)

(58) Field of Classification Search
  CPC ...... G06N 3/063; G06N 3/04; G06F 2119/12; G06F 30/30; G06F 30/3312; G06F 30/373; Y02D 10/00; G01R 31/2882
  USPC ....................................................... 716/134
  See application file for complete search history.

(56) References Cited

U.S. PATENT DOCUMENTS

2015/0186561 A1*   7/2015   Teig .................... G06F 30/3312
                                                    716/134

OTHER PUBLICATIONS

Shan et al., "A Bi-Directional, Zero-Latency Adaptive Clocking Circuit in a 28-nm Wide AVFS System," IEEE Journal Of Solid-State Circuits, vol. 55, No. 3, Mar. 2020, pp. 826 and 835, 2 pages.
Shen et al., "TG-SPP: A One-Transmission-Gate Short-Path Padding for Wide-Voltage-Range Resilient Circuits in 28-nm CMOS," IEEE Journal Of Solid-State Circuits, vol. 55, No. 5, May 2020, pp. 1422-1436, 15 pages.
Shang et al., "A Wide-Voltage-Range Transition-Detector With In-Situ Timing-Error Detection and Correction Based on Pulsed-Latch Design in 28 nm CMOS," IEEE Transactions On Circuits And Systems—I: Regular Papers, vol. 67, No. 11, Nov. 2020, pp. 3933-3943, 11 pages.

* cited by examiner

*Primary Examiner* — Paul Dinh
(74) *Attorney, Agent, or Firm* — MUNCY, GEISSLER, OLDS & LOWE, P.C.

(57) ABSTRACT

The present invention discloses an ultralow-power negative margin timing monitoring method of a neural network circuit, relates to an adaptive voltage regulation technology based on on-chip timing detection, and belongs to the technical field of low-power design of integrated circuit. The present invention provides an ultralow-power operating method of neural network circuit. By inserting a timing monitoring unit in specific position of critical paths and setting partial circuits to operate under "negative margin", the system can further lower voltage, compress the timing slack, and obtain higher power gain.

7 Claims, 7 Drawing Sheets

ULTRA LOW-POWER NEGATIVE MARGIN TIMING MONITORING METHOD FOR NEURAL NETWORK CIRCUIT

BACKGROUND

Technical Field

The present invention discloses an ultralow-power negative margin timing monitoring method of a neural network circuit, relates to an adaptive voltage regulation technology based on on-chip timing detection, and belongs to the technical field of a low-power design of integrated circuit.

Related Art

With the gradual decrease of a process dimension of integrated circuit (IC), the influence of deviations such as process-voltage-temperature (PVT) on the circuit will be increasing. An IC designer may generally enable a chip to be capable of normally operating even in a PVT environment under the worst condition by reserving the timing slack. "The worst condition" refers to a condition that various unfavorable factors causing adverse influence on circuit timing occur at the same time. However, in the practical operation of the chip, the worst condition seldomly occurs or even does not occur. This causes a too conservative design, resulting in chip performance and power consumption waste.

According to an on-chip timing monitoring technology, a timing monitoring unit is inserted into a circuit to monitor the influence of the PVT deviation on the timing of critical paths, operating voltage is adaptively regulated according to monitored information, the reserved timing slack is effectively released to further improve the performance, and the influence of the PVT deviation on the circuit is inhibited. In a digital circuit, one of most important factors influencing the function and performance is the critical path, i.e., one or one group of paths with longest delay in the circuit.

In order to ensure normal operation of the digital circuit, all of the critical paths must be ensured to be capable of correctly transmitting output data of a previous cycle to a next stage of register in each execution cycle of the circuit, and the register is ensured to be capable of completing correct sampling. A neural network accelerator structurally uses an arithmetic logic as a major part, and generally consists of a great quantity of multiply accumulation arithmetic units. The critical path is also generally generated by this part of logics.

At present, common arithmetic unit types in a neural network are mainly divided into addition tree type arithmetic unit and self-accumulating arithmetic unit. The self-accumulating arithmetic unit has shorter critical path delay, and can support a higher operating frequency. In order to pursue a better calculation ability, most of existing neural network accelerators use self-accumulating arithmetic units. A located path of a carry chain forms a longest topological structure in an accumulation structure, i.e., the critical path. In a traditional digital circuit design, combined with an adaptive voltage regulation scheme, generally, the system can only operate under the condition of using the most critical timing path delay as a clock cycle, and after a point of the first failure (PoFF) is reached, the voltage is immediately raised, so that the system is stabilized at a voltage point before the first failure (PBFF). The existing disclosed neural network online monitoring scheme is in the same way. In fact, the delay of the critical path is greatly correlated with data, under most conditions, the data reversal cannot occur in a longest path structure, at the moment, the adaptive regulation by using the highest bit of the accumulator register as the critical path benchmark will cause a result that a circuit still has certain timing slack, and the timing slack cannot be completely eliminated. Additionally, a conventional adaptive regulation method based on end-point timing monitoring may have timing violation missing alarm caused by critical path deactivation, thus influencing the stability of the system.

SUMMARY

The objective of the present invention is to provide an ultralow-power negative margin timing monitoring method of a neural network circuit by aiming at the defects in the above related art, the timing slack is further compressed on the premise of ensuring circuit correctness at a low circuit cost, and the technical problems of reduced power gain and poor stability when a highest bit of an accumulator register of a neural network is used as a critical path are solved.

In order to achieve the objective of the present invention, the following technical solution is adopted in the present invention.

The timing of the critical paths is monitored by a timing monitoring unit, an alarm signal is given to a system state machine at tight timing, and the state machine controls an operating voltage and an operating frequency of the system.

A timing monitoring unit insertion point is selected as follows. When an input feature value is x bits, an input weight is y bits, and after multiply operation, a data bit width is expanded to $(x+y-1)$ bits. Suppose a bit width of a critical path accumulator register of the neural network is z bits, monitoring can be performed only by aiming at an arbitrary bit from a $(x+y-1)^{th}$ bit to a $(z-2)^{th}$ bit.

For a low-power timing monitoring unit group, an input end of each timing monitoring unit is connected to a critical path of an arithmetic unit of the neural network, i.e., a timing monitoring unit insertion point in a carry chain of a self-accumulating adder. The timing of the critical path insertion point is monitored at the positive clock cycle, and an alarm signal is output at tight timing.

According to the selection of the timing monitoring unit insertion point, the operating voltage of the system will be regulated to meet that the insertion point just satisfies timing constraints. Partial circuits from the insertion point to the critical path of the neural network, i.e., the highest bit of the carry chain of the self-accumulating adder will operate under negative margin. In order to ensure circuit function correctness, all flip-flops at and after the critical path insertion point are replaced into latches to use the time borrowing characteristic of the latches. Signals can be correctly received as along as coming in the positive clock cycle.

After the flip-flops are replaced into the latches, due to the high level transparent characteristic of the latches, late arriving data can be sampled, and data transition of short paths can also be acquired, resulting in a circuit function error, called as a short path problem. Therefore, the short paths need to be lengthened to be after the clock high level. A short path repairing method is similar to repair of traditional hold time violation. For example, path delay can be prolonged in a mode of inserting buffers.

A circuit design process of the ultralow-power negative margin timing monitoring method of the neural network circuit of the present invention includes the following steps:

step I: designing a neural network accelerator circuit, and finding out critical paths; step II: inserting the timing monitoring unit into the above insertion points;

step III: replacing all flip-flops from the timing monitoring unit insertion point to critical path endpoint into latches;

step IV: repairing short paths;

step V: during circuit operation, regulating voltage and frequency according to a monitoring result that whether a timing violation exists or not; raising the voltage or lowering the frequency when the timing violation occurs; and lowering the voltage or raising the frequency otherwise.

By using the above technical solution, the present invention has the following beneficial effects: according to the ultralow-power negative margin timing monitoring method of the neural network circuit proposed by the present invention, the timing monitoring unit is inserted in a specific position of a critical circuit, the timing slack of the timing monitoring unit insertion point in the critical paths is ensured to be close to zero, and partial paths after the monitoring point operate under negative margin. The following two technical advantages are realized:

(1) The timing violation missing alarm in the conventional endpoint timing monitoring caused by path deactivation is solved, improving the system stability;

(2) The data sampling correctness of a monitoring point located path and a longer path is ensured through the time borrowing characteristic of the latches, so that the system can continuously lower the voltage to a "point of the negative margin" (PoNM) at a point before the first failure (PBFF), so as to obtain higher power gain.

DETAILED DESCRIPTION

Figure 1:
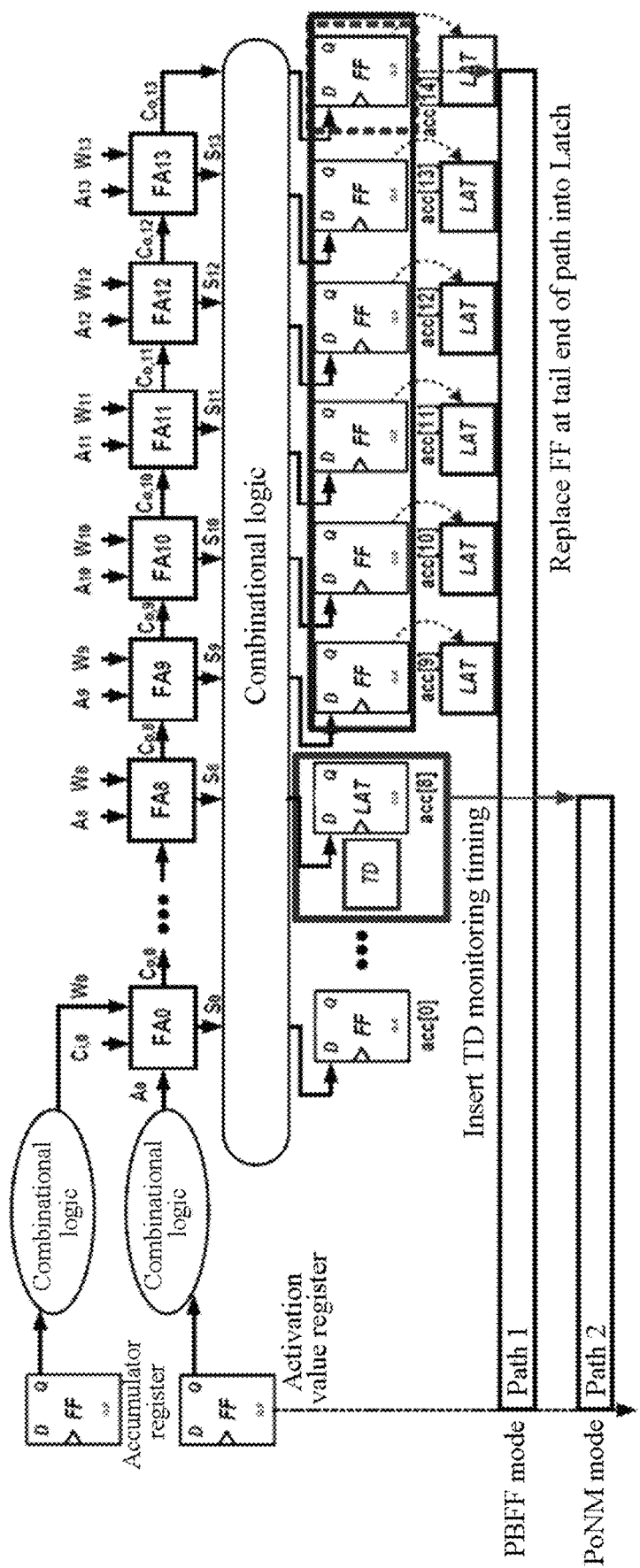
FIG. 1 is a schematic diagram of an ultralow-power negative margin timing monitoring method of a neural network circuit disclosed by the present application.

The following describes the technical solutions of the present invention in detail with reference to accompanying drawings. An ultralow-power negative margin timing monitoring method of a neural network circuit is as shown in FIG. 1. A critical path is a carry chain of a 15-bit self-accumulating adder accumulated by a result obtained by multiplying a 1-bit weight and an 8-bit activation value. A timing monitoring unit is inserted in a lowest monitoring bit ($8^{th}$ bit acc[8] of an accumulator register), a path using this register as endpoint is much shorter than a longest path, the timing slack is further compressed to PoNM in a PBFF mode, and a neural network operates in a "negative margin mode".

Figure 2:
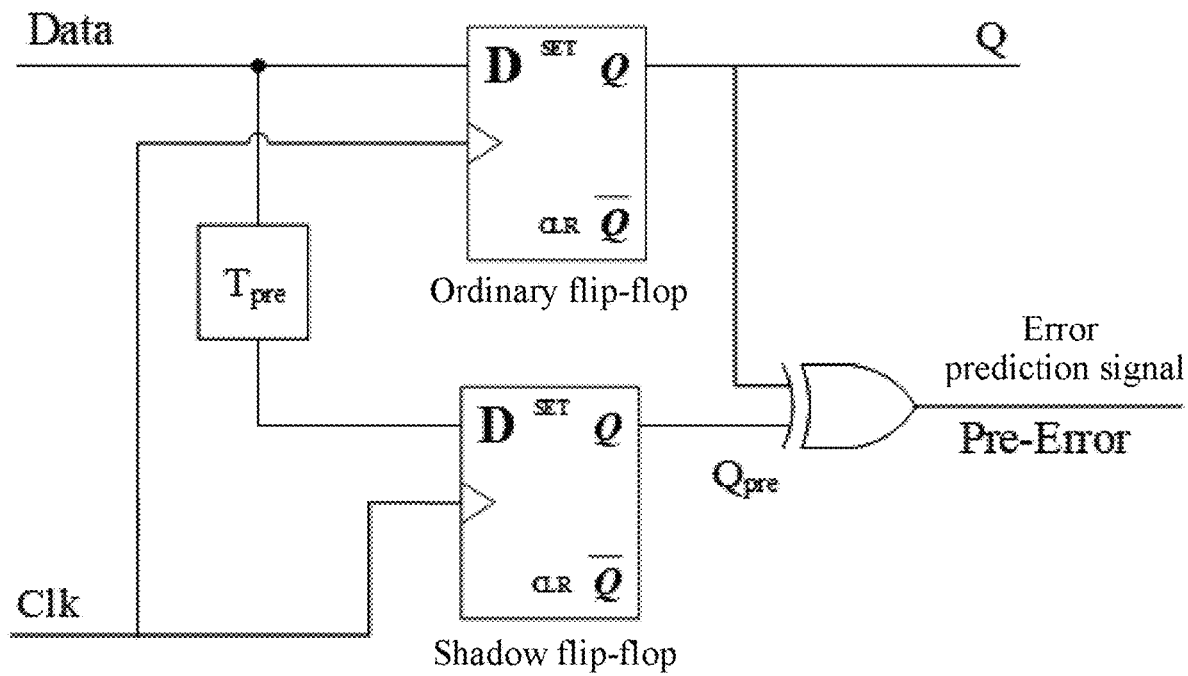
FIG. 2 is a circuit diagram of a double-sampling timing monitoring unit related to the present application.

The timing monitoring unit selects a typical Razor double-sampling monitoring unit. As shown in FIG. 2, the timing monitoring unit consists of two flip-flops, a delay unit and an exclusive-OR gate. Through the delay unit, there is certain delay on input data arriving time to the two flip-flops. At tight timing, the delayed input data will arrive after a clock rising edge without being acquired by a shadow flip-flop, resulting in different output of the two flip-flops, and the exclusive-OR gate gives an alarm signal to a system state machine to control an operating voltage and an operating frequency of a system.

As for the selection of a monitoring point position, a selection problem of an online monitoring point in the neural network is discussed under two conditions according to a carry propagation mode of the adder:

Condition I: Highest bit reversal is caused by positive and negative addition. In an operation with symbolic number addition, a highest bit of a finally generated accumulation result is a symbolic bit, representing a positive or negative result. When the symbolic bit is 0, the result is positive. When the symbolic bit is 1, the result is negative. When a negative number participates in the addition operation, a complement is generally used for calculation. Therefore, under this condition, the result of the accumulator register in this cycle will certainly generate highest bit reveal through being compared with a previous cycle. In order to prevent result overflow, during design, a bit width of the accumulator register will be reserved to be much wider than bit widths of a summand and an addend. Therefore, complement operation may cause simultaneous reversal of a plurality of higher bit numbers along with the reversal of the highest bit. In the present example, the bit width of the accumulator register is 15 bits (recorded as $0^{th}$-$14^{th}$ bits), and the bit width of an input feature value is 8 bits (recorded as $0^{th}$-$7^{th}$ bits), so that the monitoring point can select a bit from the $8^{th}$ bit to the $14^{th}$ bit.

Condition II: High bit reversal is caused by continuous positive number/negative number addition. The condition of continuous positive number addition for a plurality of cycles or continuous negative number addition for a plurality of cycles may generally cause gradual accumulation of data, resulting in higher bit data reversal. This is also a common carry propagation mode of the adder. For example, the addition operation of two 8-bit positive numbers (the highest bit is a symbolic bit) is easy to cause data accumulation to the $8^{th}$ bit and the symbolic bit expansion to the $9^{th}$ bit, so that this data path shows longer delay. This condition is different from Condition I. The high bit reversal is completely caused by the carry reversal of one bit lower, and a plurality of higher bits of data cannot reverse. By parity of reasoning, when secondarily high bit reversal is caused by continuous addition of a plurality of positive numbers or continuous addition of a plurality of negative numbers, the path delay under this condition reaches highest. In fact, Condition II is an extreme condition, and seldomly occurs in a practical neural network design. Therefore, analysis needs to be performed in conjunction with the addition bit width in specific neural network application. In the present example, the actually selectable monitoring position is from a high bit to the $13^{th}$ bit.

Figure 3:
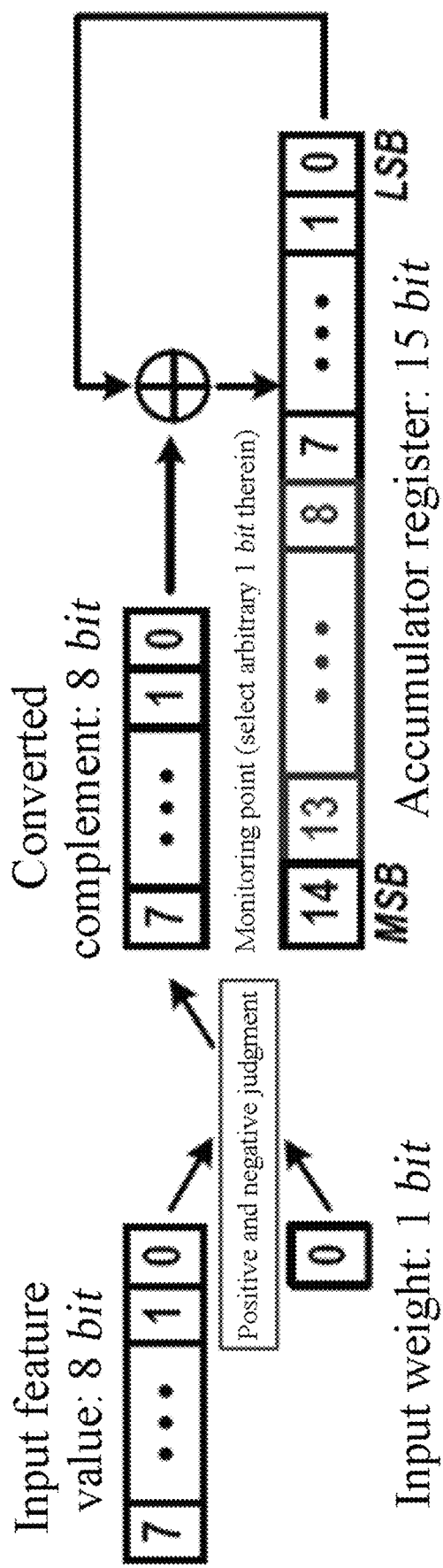
FIG. 3 is a schematic diagram of selecting a monitoring point of the present application.

Therefore, by comprehensively considering these two conditions, in the present example, the monitoring point is selected to be in an arbitrary bit from the $8^{th}$ bit to the $13^{th}$ bit of the accumulator register, i.e., in the accumulator register of each adder, all possible critical path endpoint reversal conditions can be covered by monitoring an arbitrary bit exceeding the input bit width except for the highest bit of the symbolic bit, as shown in FIG. 3. Finally, the $8^{th}$ bit is selected as the monitoring point in the neural network, a detection unit is needed during insertion at this position, the timing of the critical path insertion point is monitored at the positive clock cycle, and an alarm signal is output at tight timing.

Figure 4:
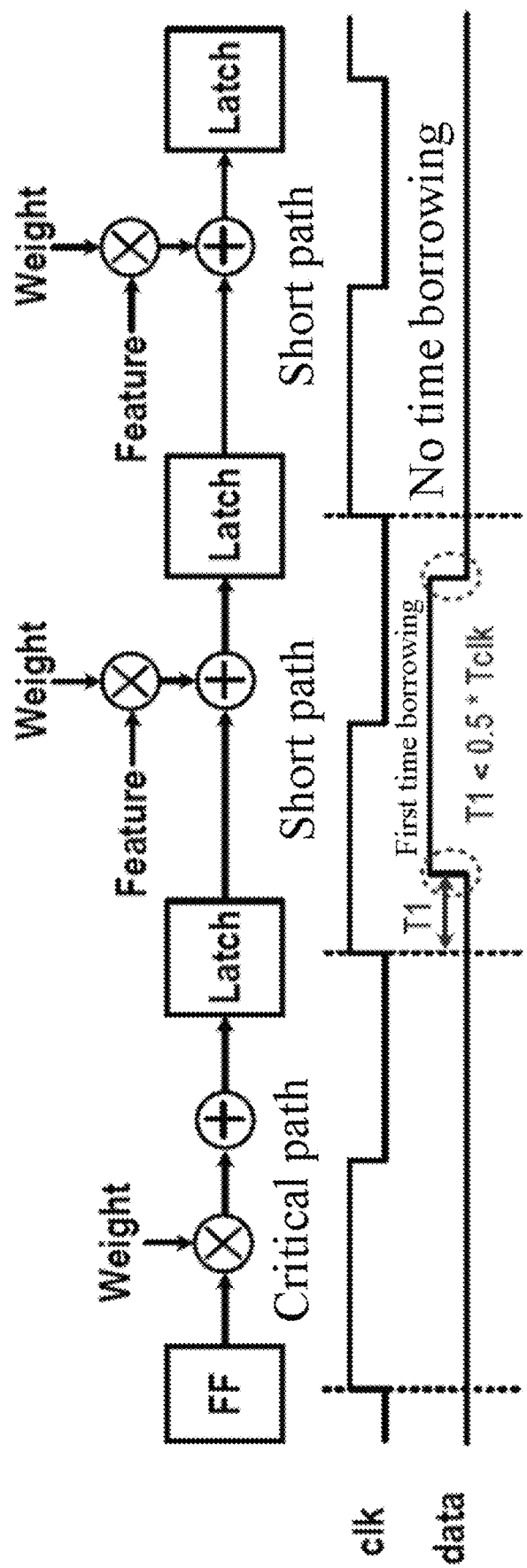
FIG. 4 is a function timing diagram of the timing monitoring unit related to the present application.

At the same time, endpoint registers from the $8^{th}$ bit to the $14^{th}$ bit are replaced into latches, so as to ensure the function correctness by using a time borrowing characteristic during timing violation. However, the latches may bring two additional problems: a continuous critical path problem and a short path problem:

The continuous critical path problem: If the time is borrowed for a plurality of continuous cycles and is accumulated to 50% of a clock cycle, latches can not sample correctly. FIG. 4 describes a data flow direction in the neural network circuit in detail. In the figure, a critical path uses a feature value register as a path starting point, and uses an accumulator register as a path ending point, a short path uses the accumulator register as a path starting point, and also uses an accumulator register as a path ending point, and dozens of times of delay differences exist between the two paths. An operation result of the critical path is stored into the accumulator register to be used as a datum for self accumulation of a next cycle. Therefore, the influence of the time borrowing of the critical path on the next cycle is embodied on the short path instead of the critical path, and this means that there will not be a condition that the same critical path in the neural network generates a timing error for two continuous clock cycles, i.e., a continuous time borrowing condition does not exist.

The short path problem: In a clock high level period, the latches can sample late arriving data, and can also acquire data reversal of the short paths, and this may cause a circuit function error. Therefore, all short paths in the circuit must be ensured to be completely repaired. Its repairing method is similar to repair of traditional hold time violation. The difference is that the short paths need to be filled after the positive clock cycle.

Figure 5:
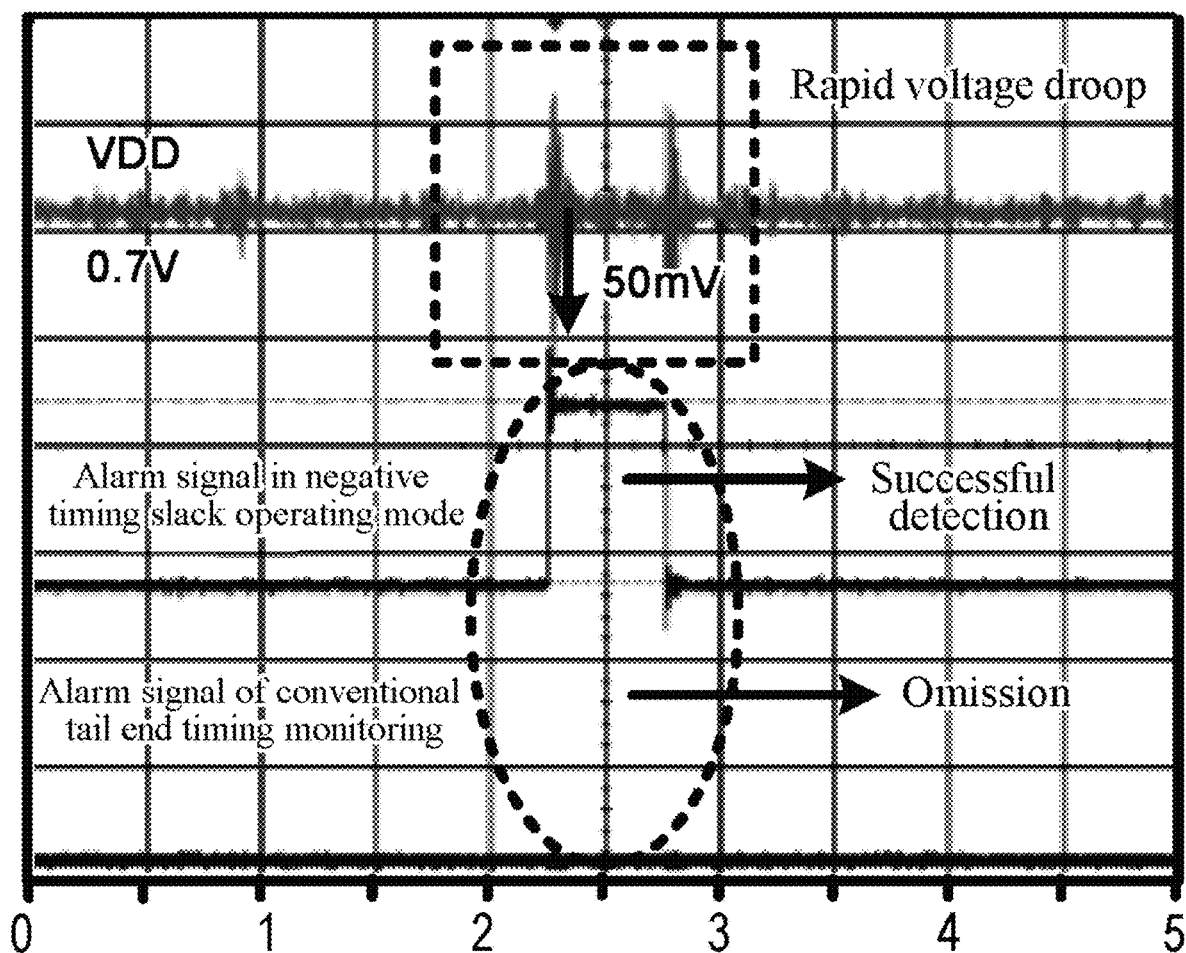
FIG. 5 is a timing violation missing alarm comparison diagram of a conventional endpoint timing monitoring method and the negative margin timing monitoring method of a neural network of the present application.

FIG. 5 is timing violation missing alarm comparison of a conventional endpoint timing monitoring method and the negative margin timing monitoring method of the neural network proposed by the present invention when a chip implemented using TSMC28nm CMOS technology generates a rapid voltage droop. The rapid voltage droop is introduced by factors such as power supply noise, circuit state switching and board level interference, it has great influence on the circuit timing when VDD voltage is low, and may cause a circuit timing error. At an actual testing stage after the chip tape out, an online monitoring function of the chip is tested under the influence of the rapid voltage droop at an amplitude of about +/−50 mV. As shown in FIG. 5, by using the conventional endpoint timing monitoring method, the timing violation missing alarm does happen, but the negative margin timing monitoring method of the neural network of the present invention can accurately capture the timing violation. 1000 rapid voltage droops are captured, a timing violation missing alarm rate is counted, the omission rate of the conventional endpoint timing monitoring method is as high as 90%, and the omission rate of the present invention is 0.

Figure 6:
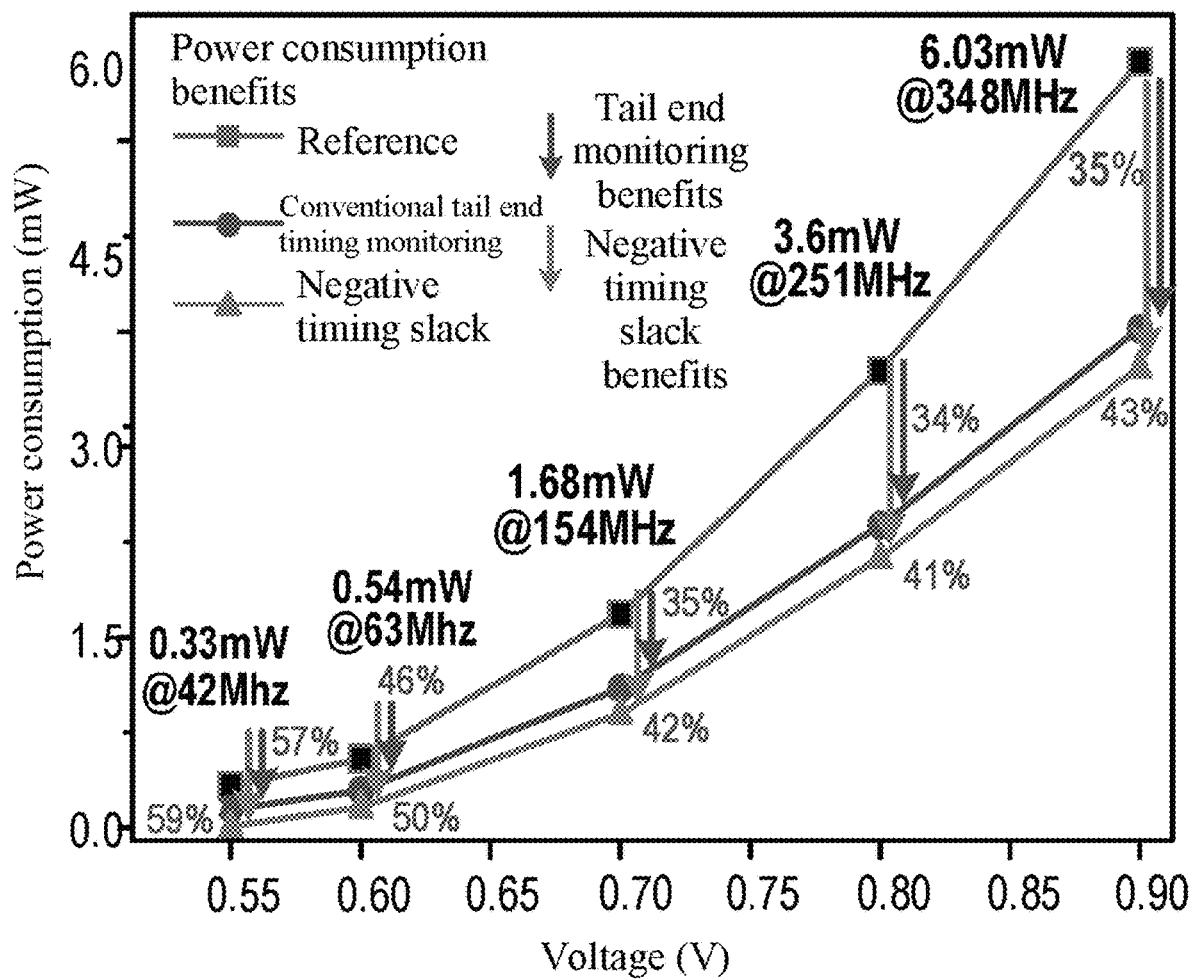
FIG. 6 is a power gain diagram of the conventional endpoint timing monitoring method and the negative margin timing monitoring method of the neural network of the present application at a wide voltage range.
Figure 7:
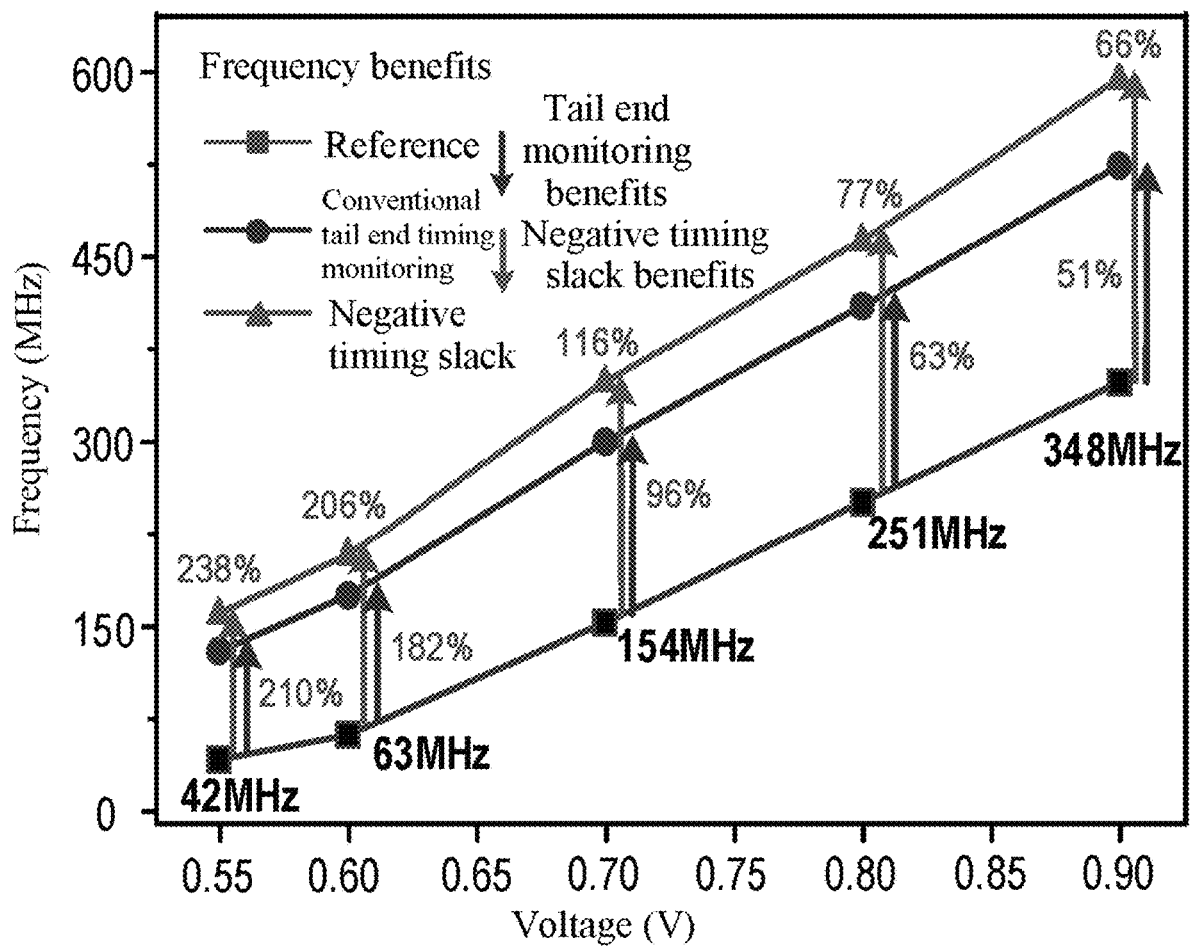
FIG. 7 is a frequency gain diagram of the conventional endpoint timing monitoring method and the negative margin timing monitoring method of the neural network of the present application at a wide voltage range.

FIG. 6 and FIG. 7 respectively show the power gain and frequency gain in a wide voltage range of the adaptive regulation of the negative margin timing monitoring method and the conventional endpoint timing monitoring method, the chip is implemented using TSMC28nm CMOS technology. The system can obtain 27.01%-58.02% power gain by using the negative margin timing monitoring method of the neural network, and the power gain are improved by about 8% compared with conventional endpoint timing monitoring method.

In summary, the timing monitoring unit is inserted in a specific position of critical path, the timing slack of the timing monitoring unit insertion point in the critical paths is ensured to be close to zero, and partial paths after the monitoring point operate under negative margin. The data sampling correctness of a monitoring point and longer path is ensured through the time borrowing characteristic of the latches, so that the system can completely eliminate the timing slack waste caused by PVT deviations, further obtains higher power gain, and overcomes the timing violation missing alarm caused by path deactivation in conventional endpoint timing monitoring at the same time, improving the system stability.

What is claimed is:

1. A negative margin timing monitoring method for a neural network circuit for ultra-low power operation, comprising:
   selecting a reversed bit of an accumulator register due to accumulation operation as a timing monitoring unit insertion point according to a bit number of neural network accumulation data and a bit width of the accumulator register in critical paths;
   inserting a timing monitoring unit in the critical paths;
   replacing all flip-flops from the timing monitoring unit insertion point to a critical path endpoint into latches;
   repairing short paths caused by the latches in the critical paths; and
   regulating voltage or frequency of the neural network circuit according to an alarm signal generated by the timing monitoring unit.

2. The negative margin timing monitoring method for the neural network circuit according to claim 1, wherein for a self-accumulating neural network circuit, an arbitrary bit from a $(x+y-1)^{th}$ bit to a $(z-2)^{th}$ bit of the accumulator register is selected as the timing monitoring unit insertion point according to a bit number x of an input feature value, a bit number y of an input weight and a bit width z of a critical path accumulator register.

3. The negative margin timing monitoring method for the neural network circuit according to claim 1, wherein repairing the short paths caused by the latches in the critical paths comprises: filling the short paths into the critical paths after a positive clock cycle.

4. The negative margin timing monitoring method for the neural network circuit according to claim 3, wherein filling the short paths into the critical paths after the positive clock cycle comprises: inserting buffers into the critical paths to prolong delay of the critical paths until the short paths are in the critical paths after the positive clock cycle.

5. The negative margin timing monitoring method for the neural network circuit according to claim 1, wherein regulating the voltage or the frequency of the neural network circuit system according to the alarm signal output by the timing monitoring unit comprises: raising the voltage or lowering the frequency when a timing violation occurs, and lowering the voltage or raising the frequency when no timing violation occurs.

6. The negative margin timing monitoring method for the neural network circuit according to claim 1, wherein the method is realized through a timing monitoring unit group, the timing monitoring unit insertion point of the critical path of each arithmetic unit of the neural network circuit is connected to a timing monitoring unit, and the timing monitoring unit monitors timing of the insertion point at a positive clock cycle and outputs an alarm signal at tight timing.

7. The negative margin timing monitoring method for the neural network circuit according to claim 1, wherein the timing monitoring unit is a Razor double-sampling monitoring unit.

* * * * *